US006970549B2

(12) United States Patent
Sher et al.

(10) Patent No.: US 6,970,549 B2
(45) Date of Patent: Nov. 29, 2005

(54) INTRACALL FEATURE FOR ACCESS NETWORK

(75) Inventors: Oleg Sher, Givalaim (IL); Url Balas, Pardesiya (IL); Victor Polak, Tel Aviv (IL); Boris Pruss, Rush Ain (IL)

(73) Assignee: Teledata Networks Ltd., Herzliya (IL)

( * ) Notice: Subject to any disclaimer, the term of this patent is extended or adjusted under 35 U.S.C. 154(b) by 96 days.

(21) Appl. No.: 09/878,500

(22) Filed: Jun. 11, 2001

(65) Prior Publication Data

US 2002/0186829 A1 Dec. 12, 2002

(51) Int. Cl.[7] .......................... H04M 7/00; H04L 12/66
(52) U.S. Cl. .................. 379/219; 379/220.01; 370/352
(58) Field of Search .............. 379/219, 220.01, 379/221.01, 229; 370/229, 352, 355, 360

(56) References Cited

U.S. PATENT DOCUMENTS

| 5,781,623 A | 7/1998 | Khakzar |
| 6,335,929 B1 * | 1/2002 | Haster ......................... 370/352 |
| 6,625,143 B1 * | 9/2003 | Kamiya et al. ............. 370/360 |
| 2003/0076931 A1 * | 4/2003 | Nakagawa et al. ...... 379/27.01 |
| 2003/0133407 A1 * | 7/2003 | Segev et al. ................ 370/229 |
| 2003/0133444 A1 * | 7/2003 | Wakamatsu ................. 370/355 |

FOREIGN PATENT DOCUMENTS

WO    WO 98/58502    12/1998

* cited by examiner

Primary Examiner—Benny Tieu
(74) Attorney, Agent, or Firm—Blakely, Sokoloff, Taylor & Zafman LLP

(57) ABSTRACT

An access network adapted to be coupled to a local exchange over a high-speed link is provided. The access network has a digital line carrier having a port adapted to be coupled to the high-speed link and a plurality of line cards. Each line card has at least one port adapted to be coupled to a transceiver. The digital line carrier selectively connects a transceiver associated with a port of one of the plurality of line cards of the digital line carrier with a transceiver associated with a port of another line card of the digital line carrier based on a signal sent to and returned by the local exchange.

24 Claims, 3 Drawing Sheets

INTRACALL FEATURE FOR ACCESS NETWORK

TECHNICAL FIELD

The present invention relates generally to the field of telecommunications and, in particular, to an intracall feature for an access network.

BACKGROUND

Many telecommunication systems have a number of access networks coupled to a local exchange. Each access network usually includes a digital line carrier coupled to the local exchange by a plurality of high-speed digital lines, e.g., a T1 or an E1 line. Typically, an interface, such as a V5.2 interface, defines the switching and signaling protocol between the digital line carrier and the local exchange. The access network provides for the connection of a number of transceivers, e.g., telephones, to the public switched telephone network (PTSN).

Typically, when using one of these systems to place a telephone call, for example, between a first transceiver and a second transceiver, the first transceiver is taken off hook, and the number of the second transceiver is entered into the first transceiver. The number is transmitted to the local exchange via a digital line carrier of an access network. Subsequently, the local exchange initiates a call establishment process, e.g., a V5.2 call establishment process, to complete the call to the second transceiver. In a typical case, each transceiver is associated with a different digital line carrier and access network. Further, the call establishment process includes allocating a time slot to each of the first and second transceivers in the high-speed digital links between the digital line carrier and the local exchange. However, in some cases, both transceivers are associated with the same digital line carrier.

One problem with the above setup is that when the first and second transceivers belong to the same access network and are coupled to the same digital line carrier, the first and second transceivers connect through the local exchange. This increases the load on the digital high-speed lines between the digital line carrier and the local exchange and thus increases the required number of lines.

For the reasons stated above, and for other reasons stated below which will become apparent to those skilled in the art upon reading and understanding the present specification, there is a need in the art for access networks that more effectively use available bandwidth in high-speed digital links between the local exchange and the digital line carrier.

SUMMARY

The above-mentioned problems with access networks and digital line carriers and other problems are addressed by embodiments of the present invention and will be understood by reading and studying the following specification. Embodiments of the present invention free up bandwidth between a digital line carrier and the local exchange by allowing calls between transceivers of the same digital line carrier (hereinafter "Intracall") to connect through the digital line carrier.

More particularly, in one embodiment, an access network adapted to be coupled to a local exchange over a high-speed link is provided. The access network has a digital line carrier having a port adapted to be coupled to the high-speed link and a plurality of line cards. Each line card has at least one port adapted to be coupled to a transceiver. The digital line carrier selectively connects a transceiver associated with a port of one of the plurality of line cards of the digital line carrier with a transceiver associated with a port of another line card of the digital line carrier based on a signal sent to and returned by the local exchange.

In another embodiment, a method for connecting two transceivers coupled to a digital line carrier of an access network coupled to a local exchange is provided. The method involves connecting the two transceivers at the local exchange. Upon connecting the two transceivers at the local exchange a tone is transmitted from the digital line carrier to the local exchange. A tone is then received from the local exchange at the digital line carrier in response to the tone from the digital line carrier. Based on receiving the tone at the digital line carrier, the two transceivers are disconnected at the local exchange and are connected at the digital line carrier.

Other embodiments are described and claimed.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments provide for connecting two transceivers belonging to the same access network and coupled to the same digital line carrier at the digital line carrier rather than at a local exchange that is coupled to the access network. This reduces the load on the local exchange and reduces the number of lines between the digital line carrier and the local exchange.

Figure 1:
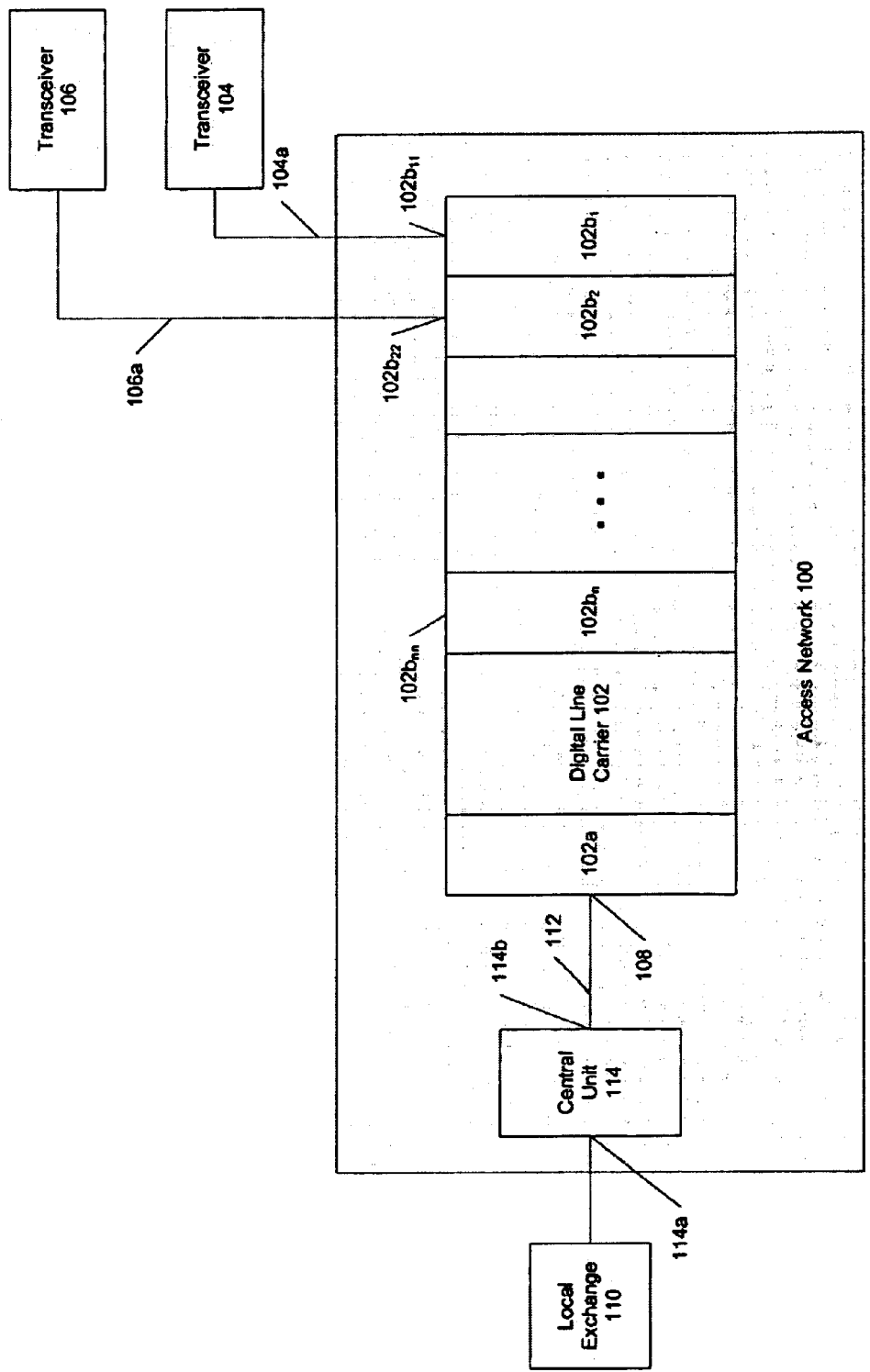
FIG. 1 is a block diagram of an embodiment of an access network according to the teachings of the present invention.

One embodiment of the present invention is shown as access network 100 in FIG. 1. Access network 100 includes digital line carrier 102 that is adapted to be coupled to a local exchange 110 over a high-speed link 112. In one embodiment, high-speed link 112 comprises one or more high-speed digital lines, e.g., T1/E1 lines. Access network 100 includes a central unit 114. Central unit 114, in one embodiment, is co-located at the local exchange. In other embodiments, central unit 114 is located separate from the local exchange. Central unit 114 has a port 114a adapted to be coupled to the local exchange and a port 114b that is coupled to high-speed link 112. Digital line carrier 102 has a network interface card 102a. Network interface card 102a has a port 108 adapted to be coupled to high-speed link 112.

Digital line carrier 102 has line cards $102b_1$–$102b_N$, e.g., ISDN cards, POTS cards, or the like. Line cards $102b_1$–$102b_N$ respectively have ports $102b_{11}$–$102b_{NN}$. Each of ports $102b_{11}$–$102b_{NN}$ is adapted to be coupled to a transceiver. For example, transceivers 104 and 106 are respectively coupled to ports $102b_{11}$ and $102b_{22}$ by lines 104a and 106a, as shown in FIG. 1. In one embodiment, one or more of line cards $102b_1$–$102b_N$ have multiple ports and transceivers, e.g., transceivers 104 and 106, are respectively coupled to one of the multiple ports of one of the line cards. In one embodiment, transceivers 104 and 106 are telephones. In another embodiment, switching and signaling between digital line carrier 102 and local exchange 110 is accomplished using a V5.2 protocol.

Figure 2:
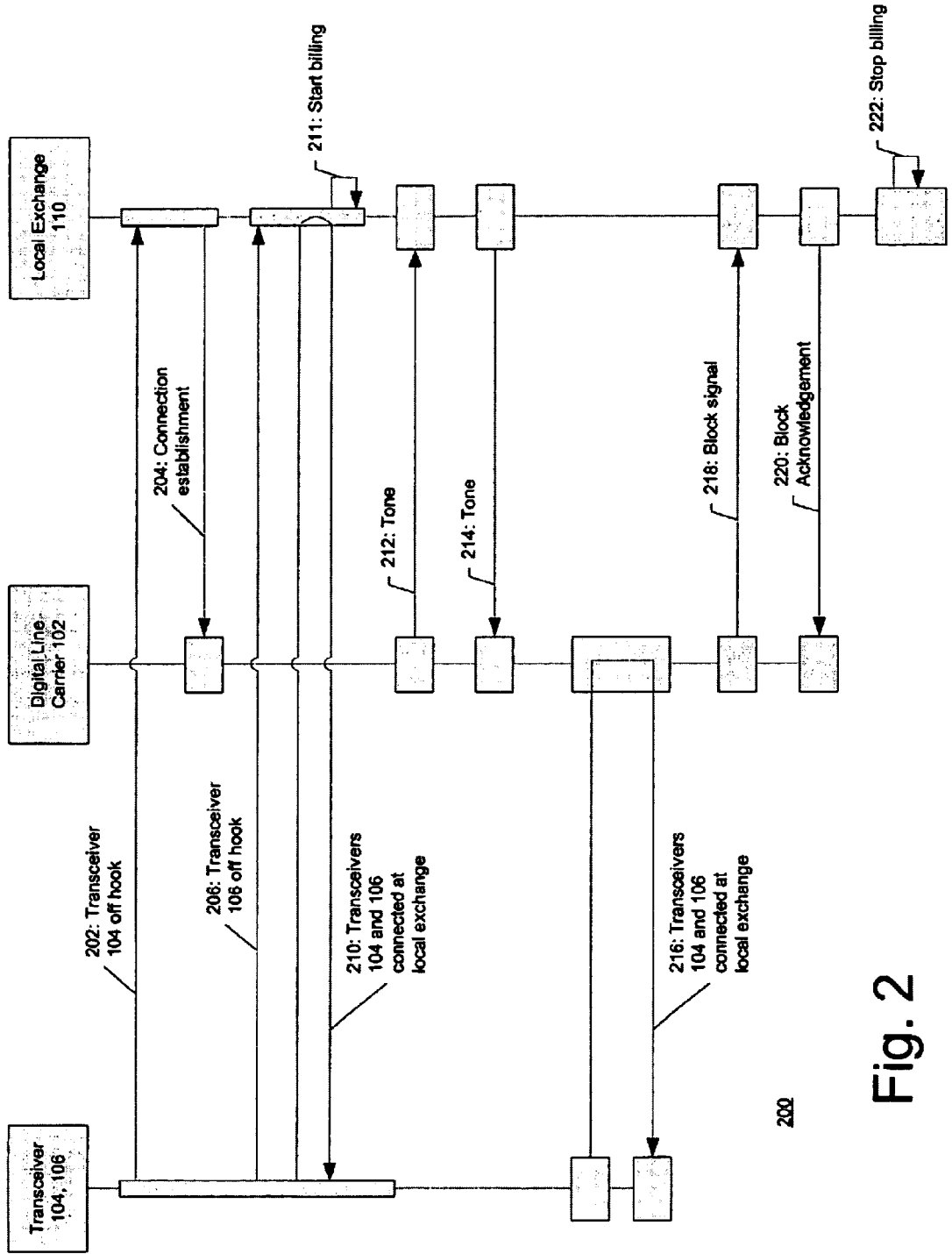
FIG. 2 is a flow diagram of an embodiment of a method for connecting two transceivers at a digital line carrier according to the teachings of the present invention.

Method 200, illustrated in the flow diagram of FIG. 2, is one embodiment of a method of the present invention for connecting transceivers 104 and 106 at digital line carrier 102. Method 200 includes taking one of transceivers 104 and 106 off hook, e.g., transceiver 104 as depicted by arrow 202. Taking transceiver 104 off hook includes sending connection initiation information from transceiver 104 to local exchange 110, e.g., entering the number of the other of transceivers 104 and 106, e.g., transceiver 106.

Then, a connection establishment process is initiated between local exchange 110 and digital line carrier 102, as depicted by arrow 204. In one embodiment, the connection establishment process involves allocating time slots in high-speed link 112 to each of transceivers 104 and 106 at local exchange 110. In another embodiment, the connection establishment process includes using a V5.2 protocol. Upon completion of the connection establishment process, transceiver 106 responds, for example, by ringing. Then, transceiver 106 is taken off hook, e.g., answering the telephone, which connects transceiver 106 to local exchange 110, as depicted by arrow 206. This connects transceivers 104 and 106 at local exchange 110, as shown by arrow 210. In other embodiments, local exchange 110 starts a billing process, as indicated by arrow 211, after transceiver 106 is connected to local exchange 110.

Upon connecting transceivers 104 and 106 at local exchange 110, digital line carrier 102 transmits a tone to local exchange 110, as indicated by arrow 212. Local exchange 110 subsequently transmits a tone back to digital line carrier 102, as indicated by arrow 214. Upon receiving the tone from local exchange 110, digital line carrier 102 determines that this is an "Intracall," e.g., a call between two transceivers of the same digital line carrier. To save bandwidth in high-speed link 112, digital line carrier 102 connects transceivers 104 and 106 at digital line carrier 102, as shown by arrow 216. In embodiments where time slots are allocated to each of transceivers 104 and 106 at local exchange 110, connecting transceivers 104 and 106 at digital line carrier 102 releases each of the allocated time slots, so these time slots can be used for other connections.

Upon connecting transceivers 104 and 106 at digital line carrier 102, digital line carrier 102 transmits a block signal to local exchange 110, as indicated by arrow 218. The block signal tells local exchange 110 to block incoming transmissions that are destined for transceivers 104 and 106. When local exchange 110 receives the block signal, local exchange 110 disconnects transceivers 104 and 106 at the local exchange and blocks incoming transmissions that are destined for transceivers 104 and 106. Local exchange 110 subsequently transmits a block acknowledgement message to digital line carrier 102 acknowledging that incoming transmissions destined for transceivers 104 and 106 are blocked, as indicated by arrow 220. In embodiments including the billing process depicted by arrow 211, local exchange 110 terminates the billing process, as indicated by arrow 222, after digital line carrier 102 receives the block acknowledgement message.

Figure 3:
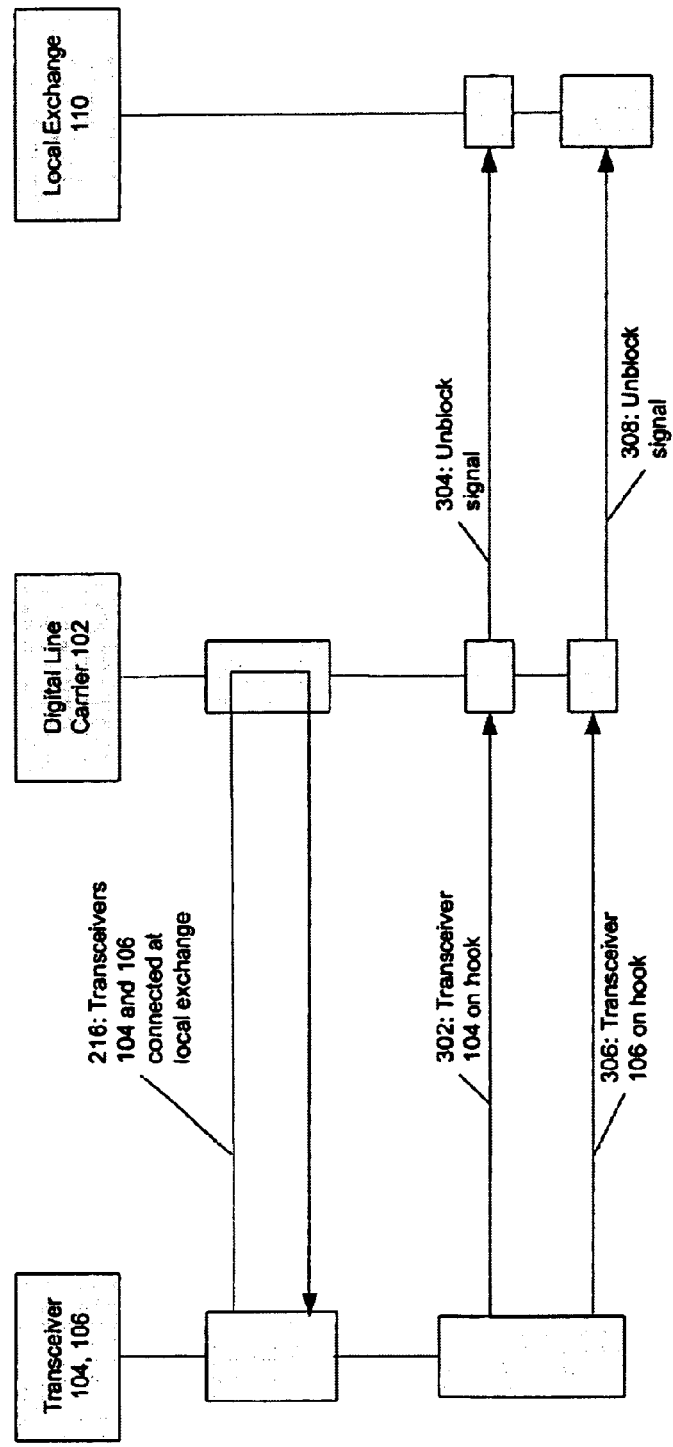
FIG. 3 is a flow diagram of an embodiment of a method for disconnecting two transceivers at a digital line carrier according to the teachings of the present invention.

FIG. 3 is a flow diagram illustrating one embodiment of a method of the present invention for disconnecting transceivers 104 and 106 at digital line carrier 102. The method includes placing transceiver 104 on hook, e.g., hanging up the telephone, as depicted by arrow 302. This disconnects transceiver 104 from digital line carrier 102. Subsequently, digital line carrier 102 transmits an unblock signal to local exchange 110 that tells local exchange 110 to unblock incoming transmissions that are destined for transceiver 104, as indicated by arrow 304. Transceiver 106 is placed on hook, e.g., hanging up the telephone, as depicted by arrow 306. This disconnects transceiver 106 from digital line carrier 102. Subsequently, digital line carrier 102 transmits an unblock signal to local exchange 110 that tells local exchange 110 to unblock incoming transmissions that are destined for transceiver 106, as indicated by arrow 308.

CONCLUSION

Embodiments of the present invention have been described. The embodiments provide an access network and a method for connecting two transceivers coupled to a digital line carrier of an access network coupled to a local exchange. These embodiments provide for connecting two transceivers belonging to the same access network and coupled to the same digital line carrier at the digital line carrier rather than at the local exchange, reducing the load on the local exchange and the number of lines between the digital line carrier and the local exchange.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, transceivers 104 and 106 can be interchanged in FIGS. 2 and 3 and in the corresponding discussion above. Moreover, FIGS. 2 and 3 show that the transceiver that is taken off hook first, e.g., transceiver 104 in FIG. 2, is placed on hook first, e.g., transceiver 104 in FIG. 3. However, the transceiver that is taken off hook first is not limited to being placed on hook first. Rather, the respective transceivers can be placed on hook in any order.

What is claimed is:

1. An access network coupled to a local exchange over a high-speed link the access network comprising:
   a digital line carrier having a port coupled to the high-speed link;
   the digital line carrier having a plurality of line cards, each line card having at least one port that is coupled to a transceiver; and
   wherein the digital line carrier selectively connects a transceiver associated with a port of one of the plurality of line cards of the digital line carrier with a transceiver associated with another port of one of the plurality of line cards of the digital line carrier based on a signal sent to and returned by the local exchange; and
   wherein the digital line carrier is adapted to transmit a block signal to the local exchange when the transceivers are connected at the digital line carrier.

2. The access network of claim 1, wherein the digital line carrier is adapted to transmit an unblock signal to the local exchange when one of the transceivers is disconnected at the digital line carrier.

3. An access network coupled to a local exchange over a high-speed link, the access network comprising:

a digital line carrier having a port coupled to the high-speed link;

the digital line carrier having a plurality of line cards, each line card having at least one port that is coupled to a transceiver;

wherein a transceiver associated with a port of one of the plurality of line cards of the digital line carrier and a transceiver associated with another port of one of the plurality of line cards of the digital line carrier are selectively connected at the local exchange;

wherein the digital line carrier is adapted to transmit a tone to the local exchange when the transceivers are selectively connected at the local exchange;

wherein the local exchange is adapted to transmit a tone to the digital line carrier in response to the tone from the digital line carrier; and wherein the digital line carrier is adapted to disconnect the transceivers at the local exchange and to connect the transceivers at the digital line carrier upon receiving the tone from the local exchange.

4. The access network of claim 3, further comprising a central unit having a first port coupled to the high-speed link that is coupled to the digital line carrier and a second port coupled to the local exchange.

5. The access network of claim 4, wherein the digital line carrier includes at least one network interface card having at least one port that is coupled to the high-speed link.

6. The access network of claim 3, wherein the digital line carrier is adapted to transmit a block signal to the local exchange when the transceivers are connected at the digital line carrier.

7. The access network of claim 6, wherein the digital line carrier is adapted to transmit an unblock signal to the local exchange when one of the transceivers is disconnected at the digital line carrier.

8. An access network coupled to a local exchange over a high-speed link, the access network comprising:

a central unit having a first port coupled to the high-speed link and a second port coupled to the local exchange;

a digital line carrier having at least one network interface card, the at least one network interface card having at least one port that is coupled to the high-speed link;

the digital line carrier having a plurality of line cards, each line card having at least one port that is coupled to a transceiver;

wherein the digital line carrier selectively connects a transceiver associated with a port of one of the plurality of line cards of the digital line carrier with a transceiver associated with another port of one of the plurality of line cards of the digital line carrier based on a signal sent to and returned by the local exchange; and wherein the digital line carrier is adapted to transmit a block signal to the local exchange when the transceivers are connected at the digital line carrier.

9. The access network of claim 8, wherein the digital line carrier is adapted to transmit an unblock signal to the local exchange when one of the transceivers is disconnected at the digital line carrier.

10. A method for connecting two transceivers coupled to a digital line carrier of an access network coupled to a local exchange, the method comprising:

connecting the two transceivers at the local exchange;

transmitting a tone from the digital line carrier to the local exchange;

receiving a tone from the local exchange at the digital line carrier in response to the tone from the digital line carrier;

connecting the two transceivers at the digital line carrier based on receiving the tone at the digital line carrier; and disconnecting the two transceivers at the local exchange based on receiving the tone at the digital line carrier.

11. The method of claim 10, wherein connecting the two transceivers at the local exchange comprises using a connection establishment process.

12. The method of claim 11, wherein using the connection establishment process comprises using a V5.2 protocol.

13. The method of claim 10, further comprising transmitting a block signal to the local exchange from the digital line carrier upon connecting the two transceivers at the digital line carrier.

14. The method of claim 10, further comprising respectively transmitting an unblock signal to the local exchange when each of the two transceivers is disconnected at the digital line carrier.

15. The method of claim 10, wherein connecting the two transceivers at the local exchange comprises allocating a time slot to each of the two transceivers.

16. The method of claim 10, further comprising starting a billing process upon connecting the two transceivers at the local exchange.

17. The method of claim 16, further comprising terminating the billing process upon connecting the two transceivers at the digital line carrier.

18. A method for connecting two transceivers coupled to a digital line carrier of an access network coupled to a local exchange, the method comprising:

connecting the two transceivers at the local exchange;

transmitting a tone from the digital line carrier to the local exchange;

receiving a tone from the local exchange at the digital line carrier in response to the tone from the digital line carrier;

connecting the two transceivers at the digital line carrier based on receiving the tone at the digital line carrier;

transmitting a block signal to the local exchange from the digital line carrier upon connecting the two transceivers at the digital line carrier; and disconnecting the two transceivers at the local exchange based on receiving the tone at the digital line carrier.

19. The method of claim 18, wherein connecting the two transceivers at the local exchange comprises using a connection establishment process.

20. The method of claim 19, wherein using the connection establishment process comprises using a V5.2 protocol.

21. The method of claim 18, wherein connecting the two transceivers at the local exchange comprises allocating a time slot to each of the two transceivers.

22. The method of claim 18, further comprising respectively transmitting an unblock signal to the local exchange when each of the two transceivers is disconnected at the digital line carrier.

23. The method of claim 18, further comprising starting a billing process upon connecting the two transceivers at the local exchange.

24. The method of claim 23, further comprising terminating the billing process upon connecting the two transceivers at the digital line carrier.

* * * * *